US011978939B2

(12) United States Patent
Liu et al.

(10) Patent No.: US 11,978,939 B2
(45) Date of Patent: May 7, 2024

(54) METHODS OF PREPARING A VANADIUM ELECTROLYTE AND MIXTURES THEREFOR

(71) Applicant: Venture Lending & Leasing VIII, Inc., Portola Valley, CA (US)

(72) Inventors: Yueqi Liu, Mukilteo, WA (US); Liyu Li, Bellevue, WA (US); Chenxi Sun, Mukilteo, WA (US); Richard O. Winter, El Macero, CA (US); Zhenguo Yang, Bellevue, WA (US)

(73) Assignee: VENTURE LENDING & LEASING VIII, INC., Portola Valley, CA (US)

( * ) Notice: Subject to any disclaimer, the term of this patent is extended or adjusted under 35 U.S.C. 154(b) by 23 days.

(21) Appl. No.: 16/384,654

(22) Filed: Apr. 15, 2019

(65) Prior Publication Data
US 2019/0379079 A1    Dec. 12, 2019

Related U.S. Application Data

(60) Provisional application No. 62/657,546, filed on Apr. 13, 2018.

(51) Int. Cl.
*H01M 8/18*    (2006.01)
*C01G 31/02*   (2006.01)
*H01M 8/14*    (2006.01)

(52) U.S. Cl.
CPC ............ *H01M 8/188* (2013.01); *C01G 31/02* (2013.01); *H01M 8/143* (2013.01)

(58) Field of Classification Search
CPC ........ H01M 8/188; H01M 8/18; C01G 31/02; C01G 31/00; C01G 31/06
See application file for complete search history.

(56) References Cited

U.S. PATENT DOCUMENTS

| 6,562,514 B1 * | 5/2003 | Kazacos ............... H01M 8/188 429/204 |
| 6,613,298 B2 | 9/2003 | Tanaka et al. |
| 9,406,961 B2 | 8/2016 | Kim et al. |
| 2002/0048546 A1 | 4/2002 | Tanaka et al. |
| 2004/0241552 A1 * | 12/2004 | Skyllas-Kazacos .. H01M 8/188 429/304 |
| 2015/0050570 A1 | 2/2015 | Keshavarz et al. |

(Continued)

FOREIGN PATENT DOCUMENTS

| JP | 2003-331902 A | 11/2003 |
| JP | 2004-071165 A | 3/2004 |
| KR | 20030034146 | * 5/2003 |

OTHER PUBLICATIONS

KR 20030034146 English translation. Korea. May 1, 2003. (Year: 2003).*

(Continued)

*Primary Examiner* — Christopher P Domone (74) *Attorney, Agent, or Firm* — Polsinelli PC (57) ABSTRACT

In one embodiment of the present disclosure, a composition for producing a vanadium electrolyte includes a vanadium compound and an ion solution containing vanadium ions and hydrogen ions. In another embodiment, a method for producing a vanadium electrolyte includes obtaining a vanadium compound, and mixing the vanadium compound with an ion solution containing vanadium ions and hydrogen ions.

11 Claims, 5 Drawing Sheets (56) References Cited

U.S. PATENT DOCUMENTS

2015/0056525 A1 2/2015 Lee et al.
2017/0110738 A1 4/2017 Lee et al.

OTHER PUBLICATIONS

International Search Report and Written Opinion dated Aug. 7, 2019, issued in related International Patent Application No. PCT/US2019/027513, filed on Apr. 15, 2019.
International Preliminary Report on Patentability dated Oct. 22, 2020, issued in related International Patent Application No. PCT/US2019/027513, filed on Apr. 15, 2019, 7 pages.

* cited by examiner

METHODS OF PREPARING A VANADIUM ELECTROLYTE AND MIXTURES THEREFOR

CROSS REFERENCE TO RELATED APPLICATION

The present application claims the benefit of U.S. Provisional No. 62/657,546, filed Apr. 13, 2018, the disclosure of which is hereby expressly incorporated by reference herein in its entirety.

BACKGROUND

Demand for electric power in the world increases continuously year after year. A fluctuation in the demand for electric power is also affected by an increase in industrialization and in the international living standard. From the viewpoint of the supply of electric power, nuclear plants and thermal power stations operate more efficiently at a steady state output without fluctuations. Therefore, there is a need for facilities for storing electric power. Various secondary batteries are being studied as methods of storing electric power as energy that do not cause environmental pollution and have high versatility.

In recent years, vanadium redox flow secondary batteries have been developed. The electrolyte is an important component of a vanadium flow battery. Electrolyte properties tend to dictate overall battery performance. Therefore, embodiments of the present disclosure are directed to the vanadium electrolyte and methods of producing a vanadium electrolyte.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment of the present disclosure, a composition for producing a vanadium electrolyte is provided. The composition includes: a vanadium; and an ion solution containing vanadium ions and hydrogen ions.

In another embodiment of the present disclosure, a method for producing a vanadium electrolyte is provided. The method includes: obtaining a vanadium compound; and mixing the vanadium compound with an ion solution containing vanadium ions and hydrogen ions.

In another embodiment of the present disclosure, a method for producing a vanadium electrolyte is provided. The method includes: obtaining a vanadium compound selected from the group consisting of trivalent vanadium (V(III)) compound, tetravalent vanadium (V(IV)) compound, pentavalent vanadium (V(V)) compound, or mixtures thereof; and mixing the vanadium compound with an acidic vanadium ion solution, wherein the vanadium ion solution is selected from the group consisting of bivalent vanadium (V(II)) ions, trivalent vanadium (V(III)) ions, and pentavalent vanadium (V(V)) ions, or any combinations thereof, and wherein the vanadium ion solution includes at least one group of vanadium ions having a different oxidation state than the oxidation state of the vanadium ions produced by dissolving the vanadium compound.

In any of the embodiments described herein, the ion solution may include at least one group of vanadium ions having a different oxidation state than the oxidation state of the vanadium ions produced by dissolving the vanadium compound.

In any of the embodiments described herein, the vanadium compound may be selected from the group consisting of trivalent vanadium (V(III)) compound, tetravalent vanadium (V(IV)) compound, pentavalent vanadium (V(V)) compound, or mixtures thereof.

In any of the embodiments described herein, the vanadium compound may be selected from the group consisting of $V_2O_3$ trivalent vanadium (V(III)) compound, $VCl_3$ trivalent vanadium (V(III)) compound, $V_2(SO_4)_3$ trivalent vanadium (V(III)) compound powder, $V_2O_4$ tetravalent vanadium (V(IV)) compound, $VOSO_4$ tetravalent vanadium (V(IV)), $V_2O_5$ tetravalent vanadium (V(V)) compound, and mixtures thereof.

In any of the embodiments described herein, the ion solution may include vanadium ions selected from the group consisting of bivalent vanadium (V(II)) ions, trivalent vanadium (V(III)) ions, and pentavalent vanadium (V(V)) ions, or any combinations thereof.

In any of the embodiments described herein, the ion solution may include an acid selected from the group consisting of sulfuric acid, hydrochloric acid, phosphoric acid, nitric acid, and any combination thereof.

In any of the embodiments described herein, the total vanadium concentration of the vanadium electrolyte may be in a range of 0.5 M to 12 M or in a range of 1.5 M to 12 M.

In any of the embodiments described herein, the vanadium compound may be mixed with the vanadium ion solution and the acid at a temperature selected from the group consisting of less than 70° C., less than 60° C., and ambient temperature.

In any of the embodiments described herein, the reaction time for a complete reaction dissolution of the vanadium compound may be within a period of less than 10 minutes, less than 3 hours, and less than 5 hours.

In any of the embodiments described herein, the vanadium ion solution may be generated by a redox flow battery (RFB).

In any of the embodiments described herein, the mixed vanadium compounds may include trivalent vanadium (V(III)) compound and pentavalent vanadium (V(V)) compound or trivalent vanadium (V(III)) compound and tetravalent vanadium (V(IV)) compound.

In any of the embodiments described herein, the vanadium compound may include pentavalent vanadium (V(V)) compound or tetravalent vanadium (V(IV)) compound, and the vanadium ion solution may include bivalent vanadium (V(II)) ions or trivalent vanadium (V(III)) ions.

In any of the embodiments described herein, the vanadium compound may include trivalent vanadium (V(III)) compound and the vanadium ion solution may include pentavalent vanadium (V(V)) ions.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Embodiments of the present disclosure relate to the production of a vanadium electrolyte, including a trivalent vanadium ion, a tetravalent vanadium ion, or a mixture of trivalent and tetravalent vanadium ions in an acid solution such as hydrochloric acid, or sulfuric acid, by the reactive dissolution of one or more vanadium compound. The solutions obtained may be suitable for direct use in the vanadium redox battery, or the solution can provide an electrolyte concentrate or slurry which can be reconstituted by the addition of water or acid prior to use in the vanadium redox battery.

A vanadium redox flow battery includes a positive electrode solution cell and a negative electrode solution cell. Tetravalent vanadium electrolyte is put into the positive electrode solution cell and trivalent vanadium electrolyte is put into the negative electrode solution cell. During charging, the tetravalent vanadium (V(IV)) ions in the positive electrode solution change into pentavalent vanadium (V(V)) ions and the trivalent vanadium (V(III)) ions in the negative electrode solution change into bivalent vanadium (V(II)) ions. During discharging, the V(V) ions in the positive electrode solution change into V(IV) ions and the V(II) ions in the negative electrode solution change into V(III) ions. The tetravalent vanadium electrolyte may be used for the positive electrode solution and the trivalent vanadium electrolyte may be used for the negative electrode solution, but the positive electrode solution and the negative electrode solution may be a mixed solution of tetravalent vanadium and trivalent vanadium in which their amounts are equal. In these solutions, the solution of V(IV) and V(III) ions in 1:1 proportion can be directly used for the positive electrode solution and the negative electrode solution simultaneously. In accordance with embodiments of the present disclosure, a mixed vanadium containing V(IV) and V(III) ions in 1:1 proportion can be produced industrially or on the site of the redox flow battery.

Previously developed vanadium electrolyte production methods include dissolving vanadium compound powders such as $V_2O_3$, $V_2O_4$, $V_2O_5$, $VOSO_4$, or $V_2(SO_4)_3$ in an acid such as hydrochloric acid, sulfuric acid or phosphoric acid, and then agitating at a temperature of 60 to 100 degree C. for not less than 3 hours. Previously developed methods are described in include U.S. Pat. Nos. 9,406,961 and 6,613,298, and U.S. Patent Application Publication Nos. 2004/0241552 and 2015/0050570, the disclosures of which are hereby expressly incorporated by reference herein in their entirety.

All of the following reactions are at 60 to 100° C. and for a time period of greater than 3 hours.

Pentavalent vanadium (V(V)) compound+hydrogen ions→tetravalent vanadium ions (V(IV))+water:

$V_2O_5(powder)+2H^+(acid)\rightarrow 2VO_2^+(liquid)+H_2O$

Trivalent vanadium (V(III)) compound+hydrogen ions→trivalent vanadium ions (V(III))+water:

$V_2O_3(powder)+6H^+(acid)\rightarrow 2V^{3+}(liquid)+3H_2O$

Tetravalent vanadium (V(IV)) compound+ hydrogen→tetravalent vanadium ions (V(IV))+ water:

$V_2O_4(powder)+4H^+(acid)\rightarrow 2VO^{2+}(liquid)+2H_2O$

However, the above methods for producing the vanadium electrolyte are slow and require a heating step due to the slow dissolution rate of vanadium compound powders in the presence of acid alone. Because the strong acids used in the vanadium electrolyte production are highly corrosive and volatile, handling the acids tends to be difficult at elevated temperatures. Furthermore, the foregoing method of U.S. Patent Application Publication No. 2004/0241552 describes control of surface area and particle size characteristics of the vanadium compound powders for complete dissolution. If the particle size and surface area are outside the required ranges of a predetermined surface area of at least 0.1 $m_2/g$ or a predetermined particle size of at most 50 microns, only partial vanadium powder can be dissolved.

In accordance with embodiments of the present disclosure, a method for fast dissolving vanadium compounds under no or low heat conditions, and a method of fast producing a vanadium electrolyte are provided. Embodiments of the present disclosure do not require the vanadium compounds having a controlled particle size and surface area. Moreover, embodiments of the present disclosure do not require the use of any reducing agent.

In accordance with some embodiments of the present disclosure, the vanadium compound is in a solid state, for example, as a vanadium compound powder. As a non-limiting example, a suitable vanadium compound powder may have an exemplary particle size of less than 50 microns and an exemplary minimum surface area of greater than 0.1 $m^2/g$. In addition, suitable vanadium compound powders in accordance with embodiments of the present disclosure may have larger particle size, for example, up to 100 microns and larger minimum surface area, for example, greater than 0.05 $m^2/g$.

In accordance with embodiments of the present disclosure, a vanadium compound can be dissolved in an acidic solution containing at least one group of vanadium ions having a different oxidation state than the oxidation state of the vanadium ions produced by dissolving the vanadium compound.

For example, it was discovered that a pentavalent or tetravalent vanadium compound dissolved much faster in an acid solution containing the bivalent and/or trivalent vanadium ions than it did in an acid solution alone, and a trivalent vanadium compound dissolved much faster in an acid solution containing the pentavalent vanadium ions than in an acid solution alone. In such a manner, vanadium compound powders can be dissolved through a chemical reaction. In some exemplary embodiments, the following reactions take place, all within a time period of 10 minutes and ambient temperature:

Trivalent vanadium (V(III)) compound+pentavalent vanadium (V(V)) ions+hydrogen ions→tetravalent vanadium ions (V(IV)+water:

$V_2O_3(powder)+2VO_2^+(liquid)+6H^+(acid)\rightarrow 4VO^{2+}(liquid)+3H_2O$

Pentavalent vanadium (V(V)) compound+bivalent vanadium (V(II)) ions+hydrogen ions→trivalent vanadium ions (V(III))+water:

$V_2O_5(powder)+4V^{2+}(liquid)+10H^+(acid)\rightarrow 6V^{3+}(liquid)+5H_2O$

Pentavalent vanadium (V(V)) compound+trivalent vanadium (V(III)) ions+hydrogen ions→tetravalent vanadium ions (V(IV)+water:

$V_2O_5(powder)+2V^{3+}(liquid)+2H^+(acid)\rightarrow 4VO^{2+}(liquid)+H_2O$

Tetravalent vanadium (V(IV)) compound+bivalent vanadium (V(II)) ions+hydrogen ions→trivalent vanadium ions (V(III))+water:

$V_2O_4(powder)+2V^{2+}(liquid)+8H^+(acid) \rightarrow 4V^{3+}(liquid)+4H_2O$

In embodiments of the present disclosure, the acid solution containing bivalent and/or trivalent vanadium ions, and the acid solution containing tetravalent and/or pentavalent vanadium ions can be obtained by using electrochemical cells through an electrochemical reaction process.

As mentioned above, embodiments of the present disclosure provide a vanadium electrolyte producing method including a trivalent vanadium compound, a tetravalent vanadium compound, or a pentavalent vanadium compound, or one or more combinations, is directly dissolved in an acid solution containing corresponding valent vanadium ions.

Embodiments of the present disclosure relate to the production of a vanadium electrolyte, including a trivalent vanadium ion, a tetravalent vanadium ion, or a mixture of trivalent and tetravalent vanadium ions in an acid solution such as hydrochloric acid, or sulfuric acid, by the reactive dissolution of one or more vanadium compounds. The solutions obtained may be suitable for direct use in the vanadium redox battery, or the solution can provide an electrolyte concentrate or slurry which can be reconstituted by the addition of water or acid prior to use in the vanadium redox battery.

A vanadium compound used in electrolyte production may be a trivalent vanadium compound, a tetravalent vanadium compound or a pentavalent vanadium compound. One or more kinds of compounds may be combined. Non-limiting examples of the trivalent vanadium compound include vanadium(III) oxide ($V_2O_3$), vanadium(III) chloride ($VCl_3$), and vanadium(III) sulfate ($V_2(SO_4)_3$). Non-limiting examples of the tetravalent vanadium compound include vanadium(IV) oxide ($V_2O_4$) and vanadyl sulfate ($VOSO_4$). A non-limiting example of the pentavalent vanadium compound includes vanadium pentoxide ($V_2O_5$), which can be easily obtained industrially. Below in TABLE 1 is a listing of exemplary vanadium compounds.

TABLE 1

EXAMPLES OF VANADIUM COMPOUNDS

| | |
|---|---|
| trivalent (V(III)) vanadium compound | vanadium(III) oxide ($V_2O_3$), vanadium(III) chloride ($VCl_3$), vanadium(III) sulfate ($V_2(SO_4)_3$) |
| tetravalent (V(IV)) vanadium compound | vanadium(IV) oxide ($V_2O_4$), vanadyl sulfate ($VOSO_4$) |
| pentavalent (V(V)) vanadium compound | vanadium pentoxide ($V_2O_5$) |

The acid solution may be used by one or a mixture of two or more selected from the group consisting of sulfuric acid, hydrochloric acid, phosphoric acid, and nitric acid. In some embodiments, the sulfuric acid concentration to produce the disclosed vanadium electrolyte is between 0.1 molar (M) and 12 M. In other embodiments, the sulfuric acid concentration for this process may be between 0.2 M and 10 M. In other embodiments, the sulfuric acid concentration may be between 0.5 M and 5 M. In other embodiments, the hydrochloric acid concentration to produce the disclosed vanadium electrolyte is between 0.1 M and 12 M. In other embodiments, the hydrochloric acid concentration required for this process may be between 1 M and 10 M. In other embodiments, the hydrochloric acid concentration may be between 3 M and 9 M.

The vanadium ion solution includes ions selected from the group consisting of bivalent vanadium (V(II)) ions, trivalent vanadium (V(III)) ions, and pentavalent vanadium (V(V)) ions, or any combinations thereof. Below in TABLE 2 is a listing of vanadium ion oxidation states.

TABLE 1

LIST OF VANADIUM ION OXIDATION STATES

| | |
|---|---|
| bivalent (V(II)) vanadium ion | $V^{2+}$ |
| trivalent (V(III)) vanadium ion | $V^{3+}$ |
| tetravalent (V(IV)) vanadium ion | $VO^{2+}$ |
| pentavalent (V(V)) vanadium ion | $VO_2^+$ |

The final electrolyte produced by the described methods described herein may be a trivalent vanadium ion, a tetravalent vanadium ion, or a mixture of trivalent and tetravalent vanadium ions solution. Any ratio between trivalent vanadium to tetravalent vanadium is included in the scope of the present disclosure.

In some embodiments, the final total vanadium concentration of the vanadium electrolyte product that can be prepared by the methods described herein is between 0.5 M and 12 M. In other embodiments, the total vanadium concentration is between 1.5 M and 5 M.

The mixing temperature can be selected from below 80, 70, 60, 50, 40 or 30 degree C. In some embodiments, mixing temperature is below 70 or below 60 degree. C. In some embodiments, the reaction mixture was mixed at the ambient temperature.

In some embodiments, the reactive dissolution is conducted for a time of between 1 minute to 12 hours. In some embodiments, the reactive dissolution is conducted for between 5 minutes and 5 hours.

Figure 1:
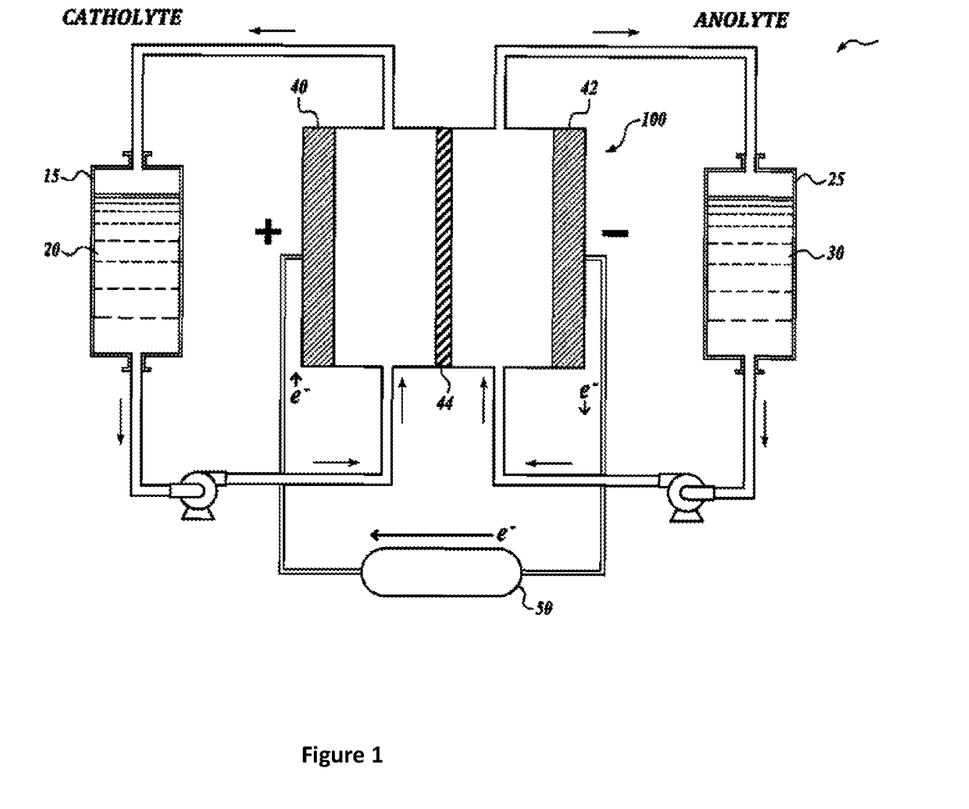
FIG. 1 is an exemplary electrochemical cell in accordance with embodiments of the present disclosure.

The electrochemical system used in the electrolyte production according to some embodiments of the present disclosure can be, for example, similar to the redox flow battery illustrated in FIG. 1. Referring to FIG. 1, a redox flow battery 10 includes an electrochemical cell 100 that includes a positive electrode 40, a negative electrode 42, and a membrane or separator 44 between positive electrode 40 and negative electrode 42 that allows for selective conduction of ionic charges for charge transportation and compensation. The redox flow battery also includes a catholyte (i.e., positive electrolyte) 20 contained in catholyte tank 15, and an anolyte (i.e., negative electrolyte) 30 contained in anolyte tank 25. Catholyte 20 includes cathode redox-active ions and anolyte 30 includes anode redox-active ions. While a single electrochemical cell 100 is illustrated in FIG. 1, it will be appreciated that multiple electrochemical cells, assembled into a stack, can also be used in a redox flow battery.

During operation, catholyte 20 and anolyte 30 are delivered to electrochemical cell 100 from storage tanks 15 and 25, respectively. During battery charge, a power element 50 operates as a power source, providing electrical energy that is stored as chemical potential in the catholyte 20 and anolyte 30. As for the state of the electrolyte at the time of charging, the tetravalent vanadium in the positive electrode solution 20 is changed into pentavalent vanadium and the trivalent vanadium in the negative electrode solution 30 is changed into bivalent vanadium.

tetravalent vanadium ions (V(IV))+water+$e^-$→pentavalent vanadium (V(V)) ions+hydrogen:  Cathode:

$VO^{2+}+H_2O-e^-→VO_2^++2H^+$ trivalent vanadium ions (V(III))+$e^-$→bivalent vanadium (V(II)) ions:  Anode:

$V^{3+}+e^-→V^{2+}$

The power source can be any power source known to generate electrical power, including, but not limited to, renewable power sources, such as wind, solar, and hydroelectric. Traditional power sources, such as combustion, can also be used.

Production Example 1

Figure 2:
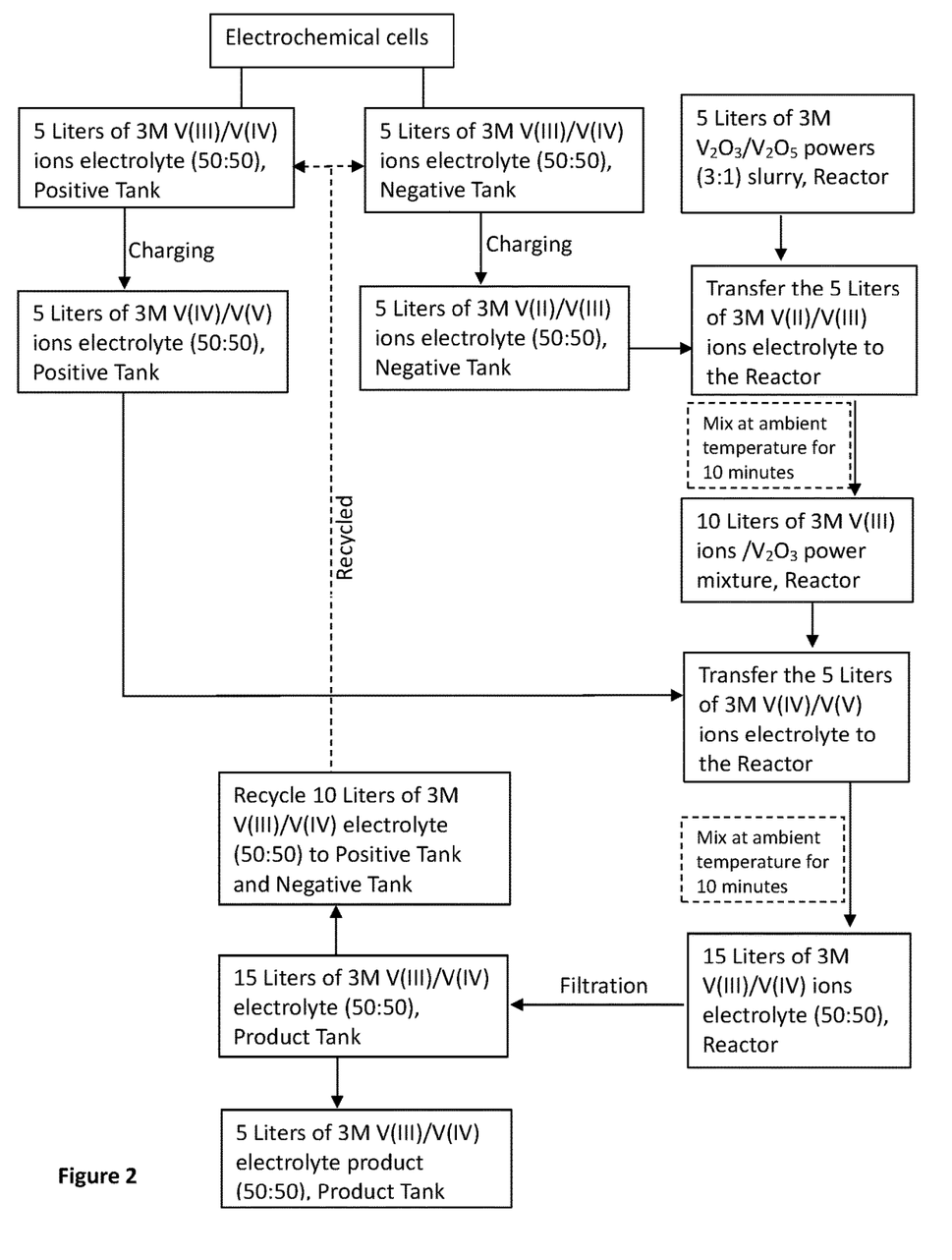
FIGS. 2-5 are flow charts showing exemplary process for producing a vanadium electrolyte by mixing a vanadium compound with an acidic vanadium ion solution in accordance with embodiments of the present disclosure.

As shown in the flow chart of FIG. 2, an initial solution of trivalent and tetravalent vanadium ions in 1:1 proportion supplied by BOLONG NEW MATERIALS (CHINA) was used as a positive electrode electrolyte and a negative electrode electrolyte. 5 litres for both positive side and negative side tanks were filled. Through an electrochemical charging process, the electrolytes in the positive tank is changed into a 50:50 mixture of pentavalent vanadium (V(V)) and tetravalent vanadium (V(IV)), and the electrolytes in the negative tank is changed into a 50:50 mixture of bivalent vanadium (V(II)) and trivalent vanadium (V(III)). Then, the negative electrolyte was transferred into a reactor which contained a mixture of vanadium (III) oxide ($V_2O_3$) compound powder, vanadium (V) oxide ($V_2O_5$) compound powder, and concentrated acid. The amounts of $V_2O_3$ and $V_2O_5$ compound powders were adjusted so that after complete reaction, the final V(III) to V(IV) ratio in the solution would be 50:50. The $V_2O_5$ powder in the reactor was allowed to react at ambient temperature. The following reaction took place after 10 minutes at ambient temperature:

Pentavalent vanadium (V(V)) compound powder+bivalent vanadium (V(II)) ions+hydrogen ions→trivalent vanadium (V(III)) ions+water:

$V_2O_5(powder)+4V^{2+}(liquid)+10H^+(acid)→6V^{3+}(liquid)+5H_2O$

A complete reaction between the $V_2O_5$ compound powder and V(II) ions in the solution could be achieved after mixing them for 10 minutes. A mixture containing V(III) ions and $V_2O_3$ compound powder could thus be obtained. Then, the positive electrolyte was also transferred into the same reactor and the remaining $V_2O_3$ compound powder was allowed to react at ambient temperature. The following reaction took place after 10 minutes at ambient temperature:

Trivalent vanadium (V(III)) compound powder+pentavalent vanadium (V(V)) ions+hydrogen ions→tetravalent vanadium (V(IV)) ions+water:

$V_2O_3(powder)+2VO_2^+(liquid)+6H^+(acid)→4VO^{2+}(liquid)+3H_2O$

A complete reaction between the $V_2O_3$ compound powder and V(V) ions in the solution could be achieved after mixing them for 10 minutes. A final electrolyte solution of V(III) to V(IV) ions in 1:1 proportion could thus be achieved.

At the end of each experiment, any undissolved powder was filtered. Part of this filtered 50:50 mixture was recycled to the positive and negative tanks for next batch production, while the rest went to product.

Production Example 2

Figure 3:
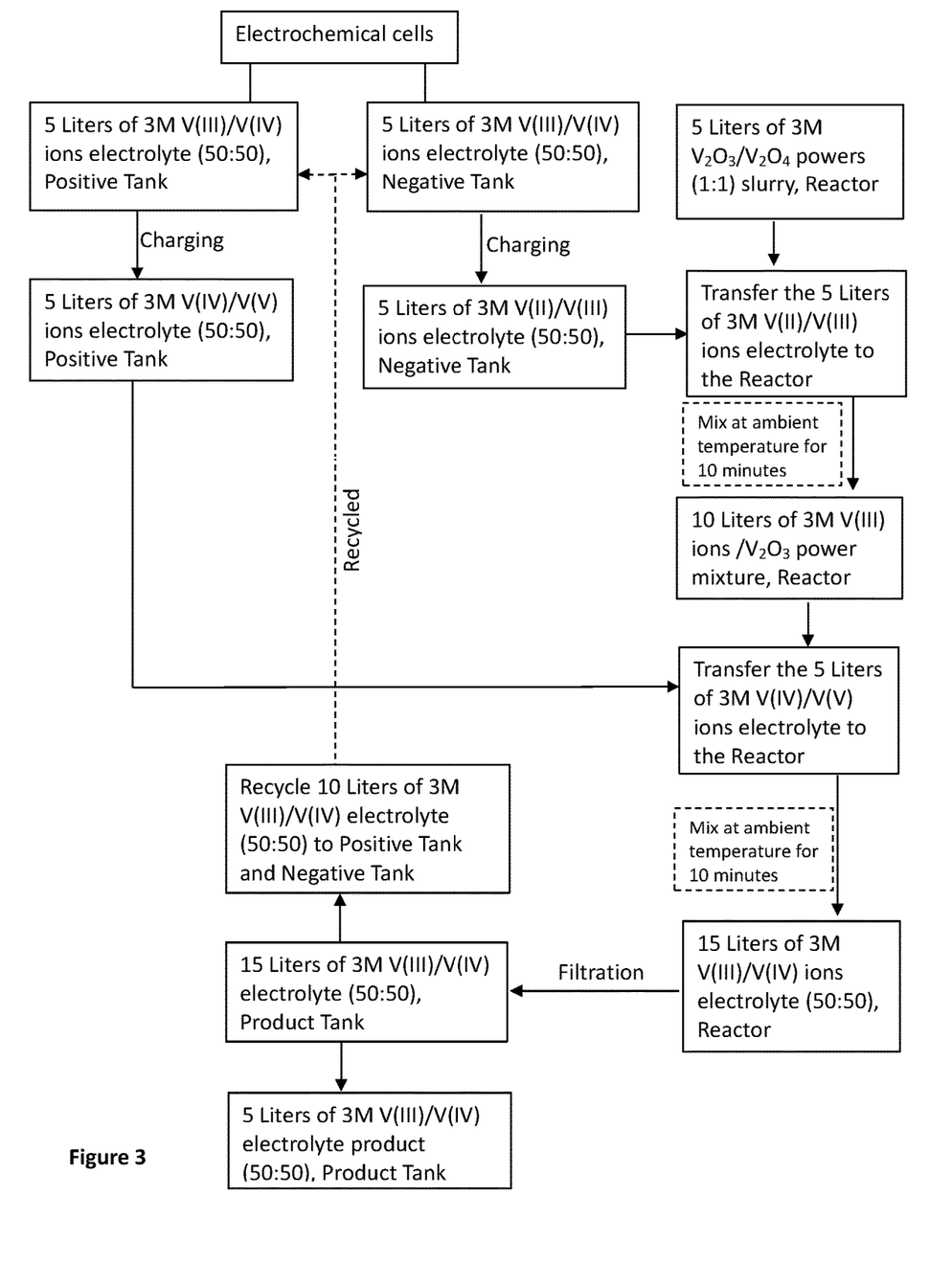

As shown in the flow chart of FIG. 3, a solution of trivalent and tetravalent vanadium ions in 1:1 proportion obtained in the PRODUCTION EXAMPLE 1 was used as a positive electrode electrolyte and a negative electrode electrolyte. 5 Liters for both positive side and negative side tanks were filled. Through an electrochemical charging process, the electrolytes in the positive tank is changed into a 50:50 mixture of pentavalent vanadium (V(V)) and tetravalent vanadium (V(IV)), and the electrolytes in the negative tank is changed into a 50:50 mixture of bivalent vanadium (V(II)) and trivalent vanadium (V(III)). Then, the negative electrolyte was transferred into a reactor which contained a mixture of vanadium(III) oxide ($V_2O_3$) compound powder, vanadium (IV) oxide ($V_2O_4$) compound powder and concentrated acid. Equimolar quantities of $V_2O_3$ and $V_2O_4$ compound powders were used so that after complete reaction, the final V(III) to V(IV) ratio in the solution would be 50:50.

The $V_2O_4$ compound powder in the reactor was allowed to react at ambient temperature. The following reaction took place after 10 minutes at ambient temperature:

Tetravalent vanadium (V(IV)) compound powder+bivalent vanadium (V(II)) ions+hydrogen ions→trivalent vanadium (V(III)) ions+water:

$V_2O_4(powder)+2V^{2+}(liquid)+8H^+(acid)→4V^{3+}(liquid)+4H_2O$

A complete reaction between the $V_2O_4$ compound powder and V(II) ions in the solution could be achieved after mixing them for 10 minutes. A mixture containing V(III) ions and $V_2O_3$ compound powder could thus be obtained.

Then, the positive electrolyte was also transferred into the same reactor and the remaining $V_2O_3$ compound powder was allowed to react at ambient temperature. The following reaction took place after 10 minutes at ambient temperature:

Trivalent vanadium (V(III)) compound powder+pentavalent vanadium (V(V)) ions+hydrogen ions→tetravalent vanadium (V(IV)) ions+water:

$V_2O_3(powder)+2VO_2^+(liquid)+6H^+(acid)→4VO^{2+}(liquid)+3H_2O$

A complete reaction between the $V_2O_3$ compound powder and V(V) ions in the solution could be achieved after mixing them for 10 minutes. A final electrolyte solution of V(III) to V(IV) ions in 1:1 proportion could thus be achieved.

At the end of each experiment, any undissolved powder was filtered. Part of this filtered 50:50 mixture was recycled to the positive and negative tanks for next batch production, while the rest went to product.

Production Example 3

Figure 4:
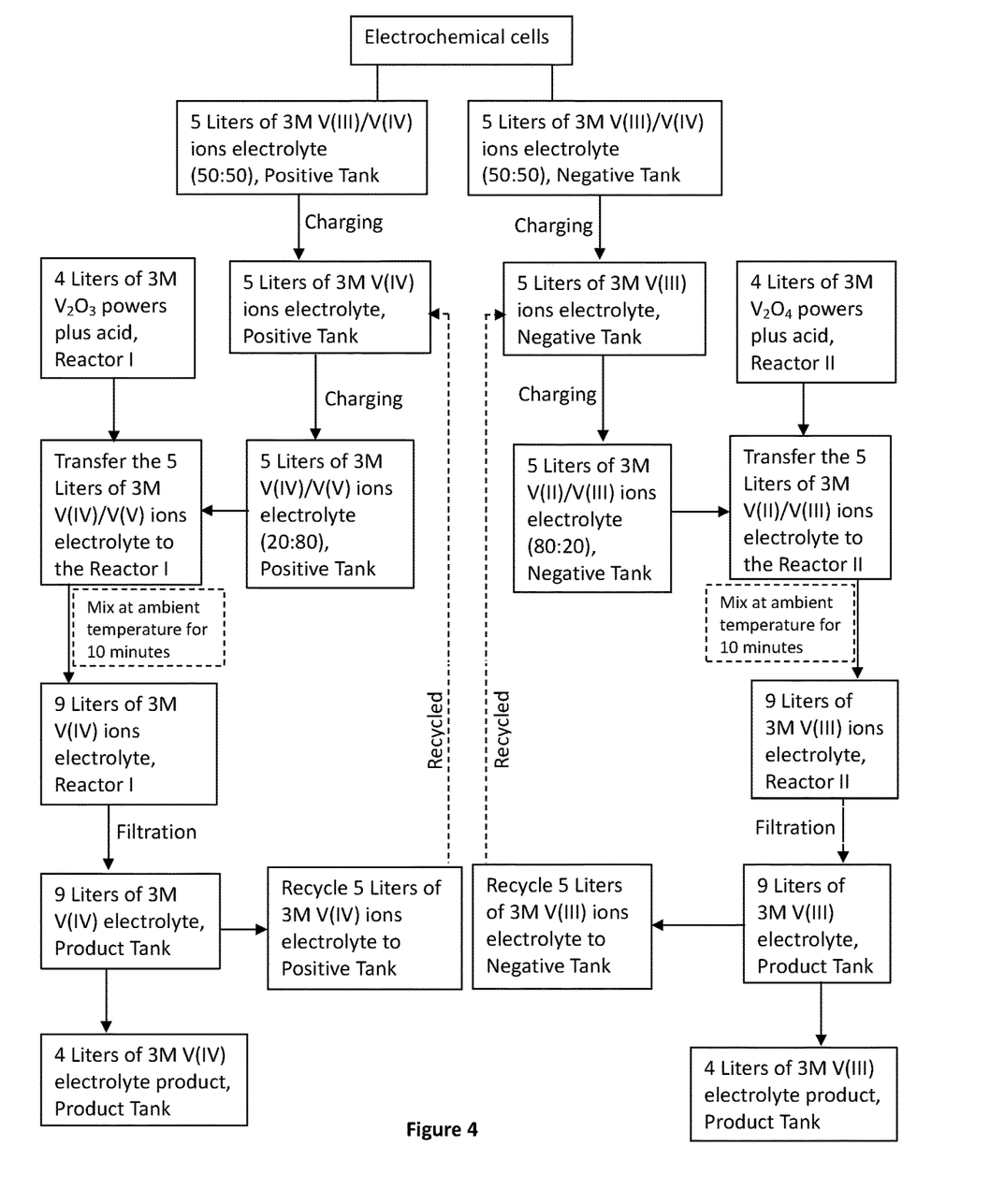

As shown in the flow chart of FIG. 4, a solution of trivalent and tetravalent vanadium ions in 1:1 proportion obtained in the PRODUCTION EXAMPLE 1 was used as a positive electrode electrolyte and a negative electrode electrolyte. 5 Liters for both positive side and negative side tanks were filled. Through an electrochemical charging process, the electrolytes in the positive tank is changed into tetravalent vanadium (V(IV)), and the electrolytes in the negative tank is changed into trivalent vanadium (V(III)). Then, the electrolytes in the positive tank is changed into a 80:20 mixture of pentavalent vanadium (V(V)) and tetravalent vanadium (V(IV)), and the electrolytes in the negative tank is changed into a 80:20 mixture of bivalent vanadium (V(II)) and trivalent vanadium (V(III)), through a further electrochemical charging process.

The positive electrolyte was transferred into Reactor I which contained a mixture of vanadium(III) oxide ($V_2O_3$) compound powder and concentrated acid. The amount of $V_2O_3$ was adjusted so that after complete reaction, the final percentage of V(IV) ions in the solution would be 100 percent. The $V_2O_3$ compound powder in the Reactor I was allowed to react at ambient temperature. The following reaction took place after 10 minutes at ambient temperature:

Trivalent vanadium (V(III)) compound powder+pentavalent vanadium (V(V)) ions+hydrogen ions→tetravalent vanadium (V(IV)) ions+water:

$V_2O_3$(powder)+$2VO_2^+$(liquid)+$6H^+$(acid)→$4VO^{2+}$(liquid)+$3H_2O$

A complete reaction between the $V_2O_3$ compound powder and V(V) ions in the solution could be achieved after mixing them for 10 minutes. A final 100% V(IV) electrolyte solution could thus be obtained.

The negative electrolyte was transferred into Reactor II which contained a mixture of vanadium(IV) oxide ($V_2O_4$) compound powder and concentrated acid. The amount of $V_2O_4$ was adjusted so that after complete reaction, the final percentage of V(III) ions in the solution would be 100. The $V_2O_4$ compound powder in the Reactor II was allowed to react at ambient temperature. The following reaction took place after 10 minutes at ambient temperature:

Tetravalent vanadium (V(IV)) compound powder+bivalent vanadium (V(II)) ions+hydrogen ions→trivalent vanadium (V(III)) ions+water:

$V_2O_4$(powder)+$2V^{2+}$(liquid)+$8H^+$(acid)→$4V^{3+}$(liquid)+$4H_2O$

A complete reaction between the $V_2O_4$ compound powder and V(II) ions in the solution could be achieved after mixing them for 10 minutes. A final 100% V(III) electrolyte solution could thus be achieved.

At the end of each experiment, any undissolved powder was filtered. Part of the filtered V(III) and V(IV) electrolytes were recycled respectively to the positive and negative tanks for next batch production, while the rest went to product.

Production Example 4

Figure 5:
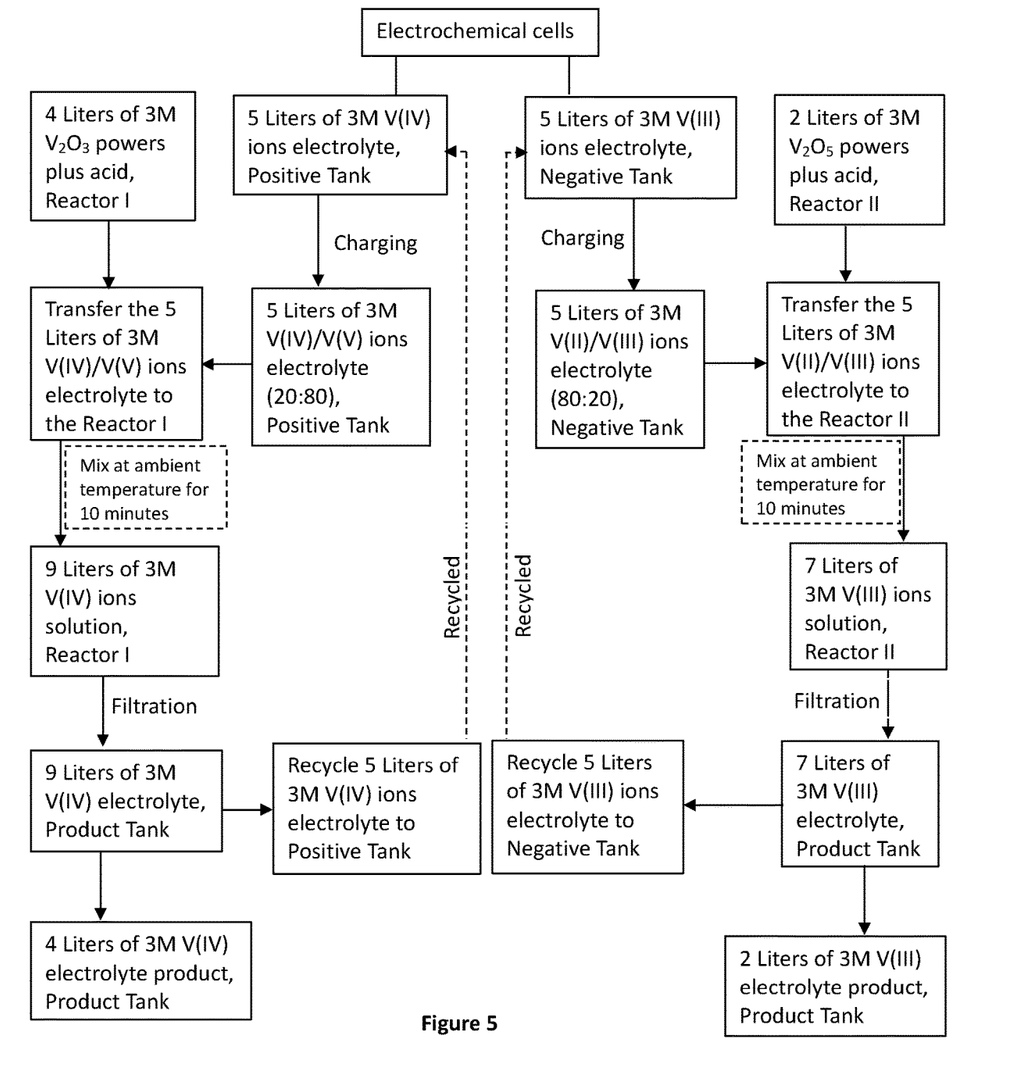

As shown in the flow chart of FIG. 5, a solution of trivalent and tetravalent vanadium ions obtained in the PRODUCTION EXAMPLE 3 was used respectively as a negative electrode electrolyte and a positive electrode electrolyte. 5 Liters for both positive side and negative side tanks were filled. Through a electrochemical charging process, the electrolytes in the positive tank is changed into a 80:20 mixture of pentavalent vanadium (V(V)) and tetravalent vanadium (V(IV)), and the electrolytes in the negative tank is changed into a 80:20 mixture of bivalent vanadium (V(II)) and trivalent vanadium (V(III)).

The positive electrolyte was transferred into Reactor I which contained a mixture of vanadium(III) oxide ($V_2O_3$) compound powder and concentrated acid. The amount of $V_2O_3$ was adjusted so that after complete reaction, the final percentage of V(IV) ions in the solution would be 100. The $V_2O_3$ compound powder in the Reactor I was allowed to react at ambient temperature. The following reaction took place after 10 minutes at ambient temperature:

Trivalent vanadium (V(III)) compound powder+pentavalent vanadium (V(V)) ions+hydrogen ions→tetravalent vanadium (V(IV)) ions+water:

$V_2O_3$(powder)+$2VO_2^+$(liquid)+$6H^+$(acid)→$4VO^{2+}$(liquid)+$3H_2O$

A complete reaction between the $V_2O_3$ compound powder and V(V) ions in the solution could be achieved after mixing them for 10 minutes. A final 100% V(IV) electrolyte solution could thus be obtained.

The negative electrolyte was transferred into Reactor II which contained a mixture of vanadium(V) pentoxide ($V_2O_5$) compound powder and concentrated acid. The amount of $V_2O_5$ was adjusted so that after complete reaction, the final percentage of V(III) ions in the solution would be 100. The $V_2O_5$ compound powder in the Reactor II was allowed to react at ambient temperature. The following reaction took place after 10 minutes at ambient temperature:

Pentavalent vanadium (V(V)) compound powder+bivalent vanadium (V(II)) ions+hydrogen ions→trivalent vanadium (V(IV)) ions+water:

$V_2O_5$(powder)+$4V^{2+}$(liquid)+$10H^+$(acid)→$6V^{3+}$(liquid)+$5H_2O$

A complete reaction between the $V_2O_5$ compound powder and V(II) ions in the solution could be achieved after mixing them for 10 minutes. A final 100% V(III) electrolyte solution could thus be achieved.

At the end of each experiment, any undissolved powder was filtered. Part of the filtered V(III) and V(IV) electrolytes were recycled respectively to the positive and negative tanks for next batch production, while the rest went to product.

While illustrative embodiments have been illustrated and described, it will be appreciated that various changes can be made therein without departing from the spirit and scope of the disclosure.

The embodiments of the present disclosure in which an exclusive property or privilege is claimed are defined as follows:

1. A composition for producing a vanadium electrolyte, the composition comprising:
   a vanadium powder compound in a solid state form having a particle size of more than 50 microns up to 100 microns; and
   an ion solution containing vanadium ions and hydrogen ions, wherein the ion solution includes at least one group of vanadium ions having a different oxidation state than the oxidation state of the vanadium ions produced by dissolving the vanadium powder compound.

2. The composition of claim 1, wherein the vanadium powder compound is selected from the group consisting of trivalent vanadium (V(III)) compound, tetravalent vanadium (V(IV)) compound, pentavalent vanadium (V(V)) compound, and mixtures thereof.

3. The composition of claim 1, wherein the vanadium powder compound is selected from the group consisting of $V_2O_3$ trivalent vanadium (V(III)) compound, $VCl_3$ trivalent vanadium (V(III)) compound, $V_2(SO_4)_3$ trivalent vanadium (V(III)) compound, $V_2O_4$ tetravalent vanadium (V(IV)) compound, $VOSO_4$ tetravalent vanadium (V(IV)), $V_2O_5$ tetravalent vanadium (V(V)) compound, and mixtures thereof.

4. The composition of claim 1, wherein the ion solution includes vanadium ions selected from the group consisting of bivalent vanadium (V(II)) ions, trivalent vanadium (V(III)) ions, and pentavalent vanadium (V(V)) ions, and any combinations thereof.

5. The composition of claim 1, wherein the ion solution includes an acid selected from the group consisting of sulfuric acid, hydrochloric acid, phosphoric acid, nitric acid, and any combination thereof.

6. The composition of claim 1, wherein the total vanadium concentration of the vanadium electrolyte is in the range of 1.5 M to 12 M.

7. The composition of claim 1, wherein the composition includes vanadium trioxide compound and vanadium pentavalent ions in the ion solution.

8. The composition of claim 1, wherein the composition includes vanadium dioxide (vanadium tetroxide) compound and vanadium bivalent ions in the ion solution.

9. The composition of claim 1, wherein the composition includes vanadium pentoxide compound and vanadium bivalent ions in the ion solution.

10. The composition of claim 1, wherein the composition includes vanadium pentoxide compound and vanadium trivalent ions in the ion solution.

11. A composition for producing a vanadium electrolyte, the composition comprising:

a vanadium powder compound selected from the group consisting of trivalent vanadium (V(III)) compound, tetravalent vanadium (V(IV)) compound, pentavalent vanadium (V(V)) compound, and mixtures thereof, wherein the vanadium powder compound is in a solid state form having a particle size of more than 50 microns up to 100 microns; and an ion solution containing vanadium ions and hydrogen ions, wherein the ion solution includes vanadium ions selected from the group consisting of bivalent vanadium (V(II)) ions, trivalent vanadium (V(III)) ions, pentavalent vanadium (V(V)) ions, and any combinations thereof, wherein the ion solution includes at least one group of vanadium ions having a different oxidation state than the oxidation state of the vanadium ions produced by dissolving the vanadium powder compound.

* * * * *

UNITED STATES PATENT AND TRADEMARK OFFICE
CERTIFICATE OF CORRECTION

PATENT NO. : 11,978,939 B2  
APPLICATION NO. : 16/384654  
DATED : May 7, 2024  
INVENTOR(S) : Yueqi Liu et al.

Page 1 of 1

It is certified that error appears in the above-identified patent and that said Letters Patent is hereby corrected as shown below:

In the Claims

In Claim 3, Column 10, Line 56, insert -- compound -- between "(V(IV))" and ",".

Signed and Sealed this  
Eighth Day of October, 2024

Katherine Kelly Vidal  
*Director of the United States Patent and Trademark Office*